US008459610B2

(12) United States Patent
Su et al.

(10) Patent No.: US 8,459,610 B2
(45) Date of Patent: Jun. 11, 2013

(54) ASSISTANCE MECHANISM FOR ASSISTING PATIENTS TO STAND UP

(76) Inventors: Fong-Chin Su, Tainan (TW); Jyh-Jong Chang, Kaohsiung (TW); Cheng-Chun Chen, Kaohsiung County (TW); Tain-Song Chen, Tainan (TW); Ming-Hsiang Chang, Tainan County (TW); Ying-Shieh Kung, Keelung (TW); Kuo-Hsiang Chen, Tainan (TW)

( * ) Notice: Subject to any disclaimer, the term of this patent is extended or adjusted under 35 U.S.C. 154(b) by 278 days.

(21) Appl. No.: 12/853,013

(22) Filed: Aug. 9, 2010

(65) Prior Publication Data

US 2012/0032127 A1 Feb. 9, 2012

(51) Int. Cl.
*B60P 1/02* (2006.01)

(52) U.S. Cl.
USPC .......................................... 254/2 C; 254/5 R

(58) Field of Classification Search
USPC .... 254/2 R, 3 R, 5 R, 5 C, 2 C, 88; 180/65.1, 180/907, 908; 297/DIG. 10
See application file for complete search history.

(56) References Cited

U.S. PATENT DOCUMENTS 2,053,852 A * 9/1936 Tracy ........................... 188/109
4,026,519 A * 5/1977 Piercy ........................... 254/2 R
4,360,187 A * 11/1982 Chapman ...................... 254/8 R
5,009,466 A * 4/1991 Perry ............................ 297/323
5,037,068 A * 8/1991 Grottesi ........................ 254/8 B
5,346,280 A * 9/1994 Deumite ....................... 297/330
5,730,236 A * 3/1998 Miller et al. ................. 180/65.1
6,224,154 B1 * 5/2001 Stoki ............................ 297/339
7,125,080 B1 * 10/2006 Jarema et al. ............ 297/411.32
7,451,848 B2 * 11/2008 Flowers et al. ............... 180/208
7,520,567 B2 * 4/2009 Billger et al. ............ 297/344.22
7,685,800 B2 * 3/2010 Sugio et al. .................. 56/320.1
2003/0127272 A1 * 7/2003 Baker et al. ................... 180/326
2007/0147060 A1 * 6/2007 Chen ............................ 362/513

FOREIGN PATENT DOCUMENTS

TW I303987 12/2008

* cited by examiner

*Primary Examiner* — Lee D Wilson
*Assistant Examiner* — Henry Hong
(74) *Attorney, Agent, or Firm* — Muncy, Geissler, Olds & Lowe, PLLC

(57) ABSTRACT

An assistance mechanism includes a base, a rotatable link, a lifting unit and a power unit which provides power to the lifting unit so that the lifting unit drives the rotatable link. A seat is connected to the rotatable link so that when the rotatable link is activated, the user sitting on the seat is transformed from a sit status into a stand status. This effectively assists the user who does not have sufficient muscle forces to stand up by the assistance mechanism.

5 Claims, 4 Drawing Sheets

ASSISTANCE MECHANISM FOR ASSISTING PATIENTS TO STAND UP

FIELD OF THE INVENTION

The present invention relates to an assistance mechanism, and more particularly, to an assistance mechanism to assist disabled patients to stand up and move.

BACKGROUND OF THE INVENTION

There are many disabled patients or elders who cannot walk and have to rely on electric wheelchairs. A conventional electric wheelchair is used to assist disabled patients in moving conveniently and efficiently without using too much of their muscles. However, some disabled patients or elders do not have sufficient muscles force to help themselves to stand up and the conventional electric wheelchairs cannot assist them in standing up, so that these disabled patients or elders need people to assist them. In other words, the existing conventional electric wheelchairs cannot meet needs of the disabled patients or elders.

In order to improve the shortcomings of the conventional electric wheelchairs, applicants have invented at least one assistance mechanism for assisting patients to stand up and are disclosed in Taiwan Patent Publication No. 1303987.

The present invention intends to provide an assistance mechanism for assisting patients or elders to stand up by themselves.

SUMMARY OF THE INVENTION

The present invention relates to an assistance mechanism which comprises a base. The base has a post extending from a top thereof and multiple wheels are connected to the base. A rotatable link has a first end pivotably connected to the post and a seat is connected to the rotatable link. A handle unit is pivotably connected to a second end of the rotatable link. A lifting unit is connected to the rotatable link and the base. The lifting unit drives the rotatable link. A power unit is connected to the lifting unit and provides power to the lifting unit.

The lifting unit comprises a gear unit and a link unit, wherein the gear unit is connected with the power unit and the link unit is connected to the gear unit and the rotatable link.

The gear unit comprises a frame, a first gear, a second gear and a fan-shaped gear, wherein the frame is fixed to the base and the first gear is connected to the power unit. The first gear is pivotably connected to the frame. The second gear is co-rotatable with the first gear. The fan-shaped gear is engaged with the second gear and pivotably connected to the frame. The number of teeth of the second gear is less than that of the first gear, and the number of teeth of the fan-shaped gear is larger than that of the second gear.

The link unit comprises a first link and a second link, wherein the first link is pivotably connected to the fan-shaped gear and the second link is pivotably connected between the first link and the rotatable link. The length of the second link is longer than that of the first link. By the different numbers of teeth of the gears of the gear unit and the different lengths of the links, when the power unit outputs limited power, the second link outputs high torque to drive the rotatable link to save energy. In addition, by using the two links of the link unit, the operational traces of the mechanism does not have interference.

The assistance mechanism easily allows the disable patients to stand up from the seat. The seat is lifted or lowered by the use of the rotatable link, the gear unit and the link unit. The assistance mechanism has low maintenance cost. By the different numbers of teeth of the gears of the gear unit and the different lengths of the links, the power unit can operate the mechanism by limited power.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
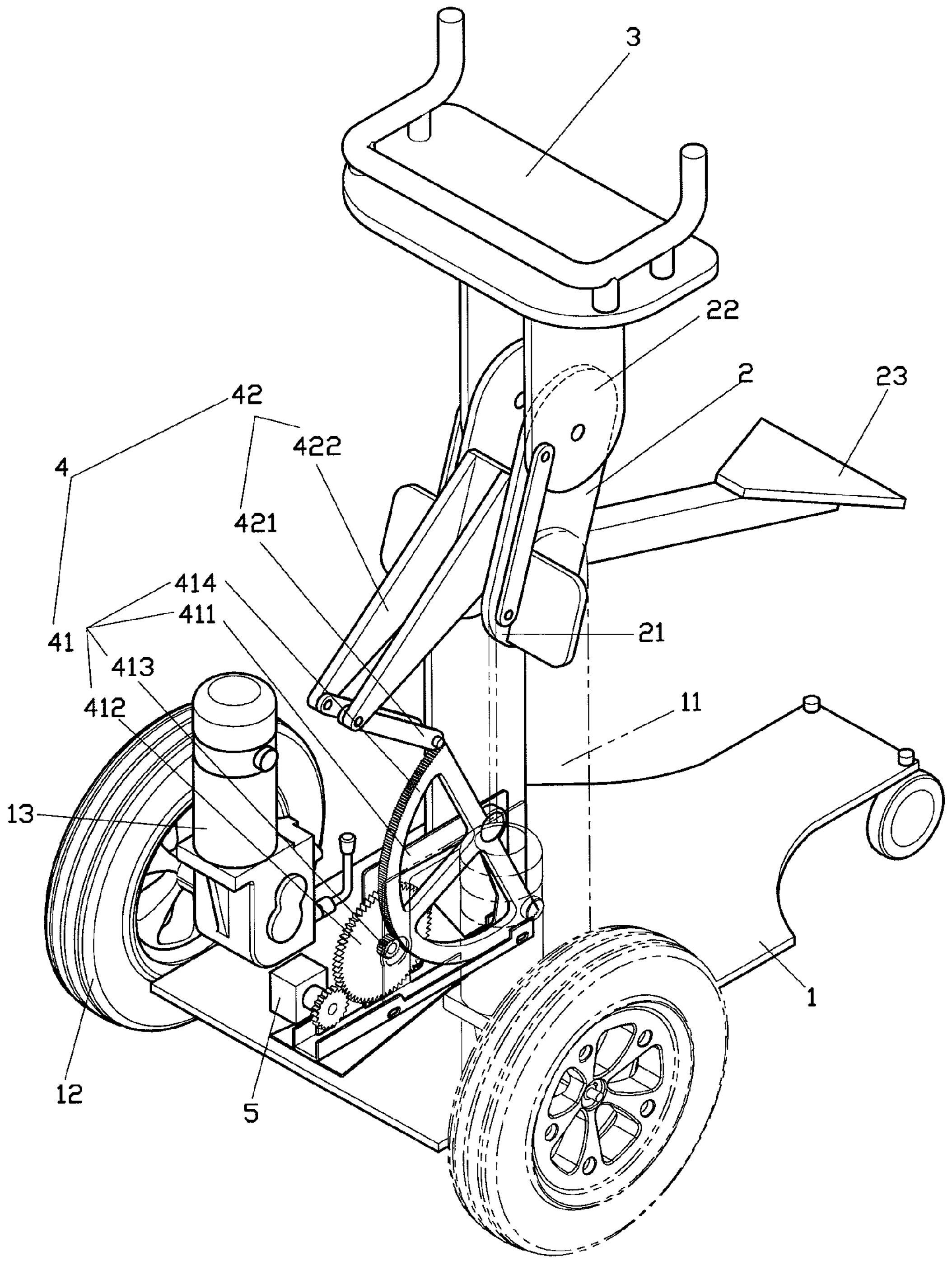
FIG. 1 is a perspective view to show the assistance mechanism of the present invention.

Referring to FIG. 1, the assistance mechanism of the present invention comprises a base 1, a rotatable link 2, a handle unit 3, a lifting unit 4 and a power unit 5.

The base 1 has a post 11 extending from a top thereof, and multiple wheels 12 are connected to the base 1. The wheels 12 are connected with a motor 13 so as to move by the power provided by the motor 13. The rotatable link 2 has a first end 21 and a second end 22. The first end 21 is pivotably connected to the post 11, and the second end 22 is pivotably connected to the handle unit. A seat 23 is fixedly connected to the rotatable link 2. The lifting unit 4 is connected to the rotatable link 2 and the base 1. The lifting unit 4 drives the rotatable link 2. The lifting unit 4 comprises a gear unit 41 and a link unit 42. The gear unit 41 is connected with the power unit 5 which provides power to the lifting unit 4. The link unit 42 is connected to the gear unit 41 and the rotatable link 2. The gear unit 41 comprises a frame 411, a first gear 412, a second gear 413 and a fan-shaped gear 414. The frame 411 is fixed to the base 1, and the first gear 412 is connected to the power unit 5. The first gear 412 is pivotably connected to the frame 411. The second gear 413 is co-rotatable with the first gear 412. The fan-shaped gear 414 is engaged with the second gear 413 and is pivotably connected to the frame 411. The number of teeth of the second gear 413 is less than that of the first gear 412. The number of teeth of the fan-shaped gear 414 is larger than that of the second gear 413. The link unit 42 comprises a first link 421 and a second link 422. The first link 421 is pivotably connected to the fan-shaped gear 414. The second link 422 is pivotably connected between the first link 414 and the rotatable link 2. A length of the second link 422 is longer than that of the first link 421.

Figure 2:
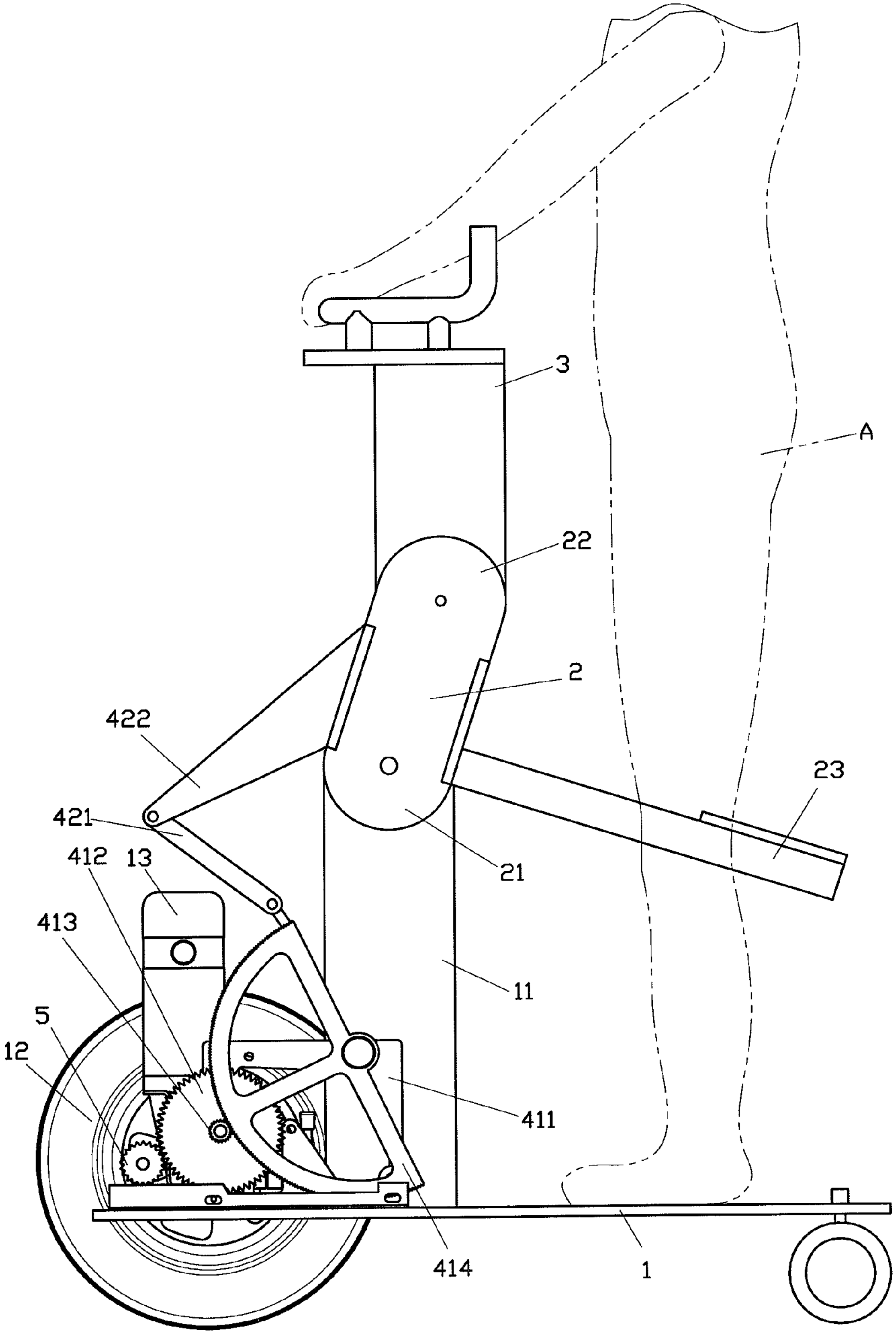
FIG. 2 shows that the seat is lowered for convenience of the user to sit thereon.

As shown in FIG. 2, when the user "A" uses the mechanism, the power unit 5 is operated to rotate the first gear 412 clockwise and the second gear 413 is rotated too so as to rotate the fan-shaped gear 414 counterclockwise to move the first and second links 421, 422. The rotatable link 2 is pivoted about the first end 211 thereof and rotates clockwise. The seat 23 is then lowered for convenience for the user "A" to sit on the seat 23. The user "A" holds the handle unit 3 and pivots the rotatable link 2 about the second end thereof 21 counterclockwise so that the user "A" can hold the handle unit 3 comfortably.

Figure 3:
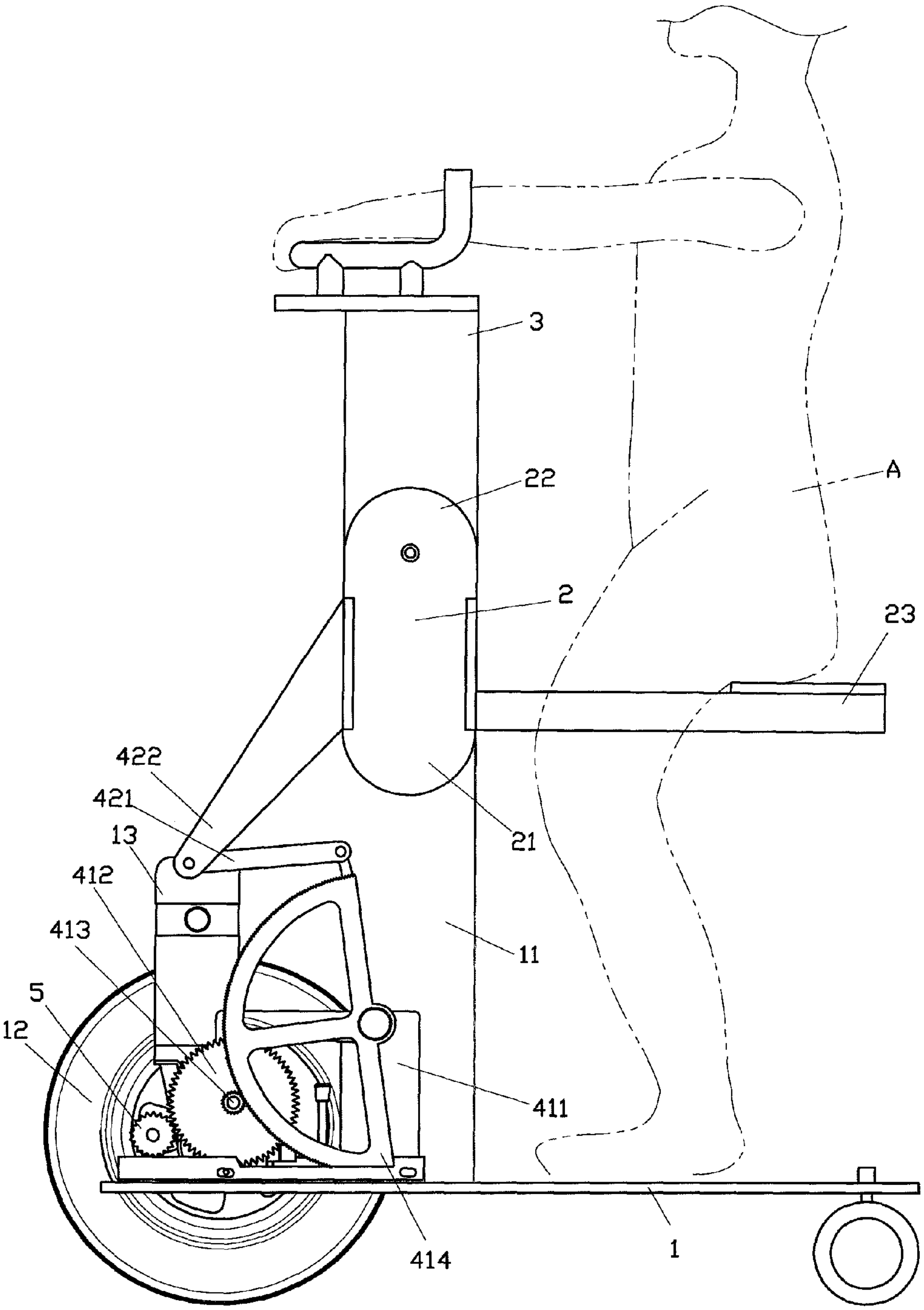
FIG. 3 shows that the seat is lifted to a normal position.
Figure 4:
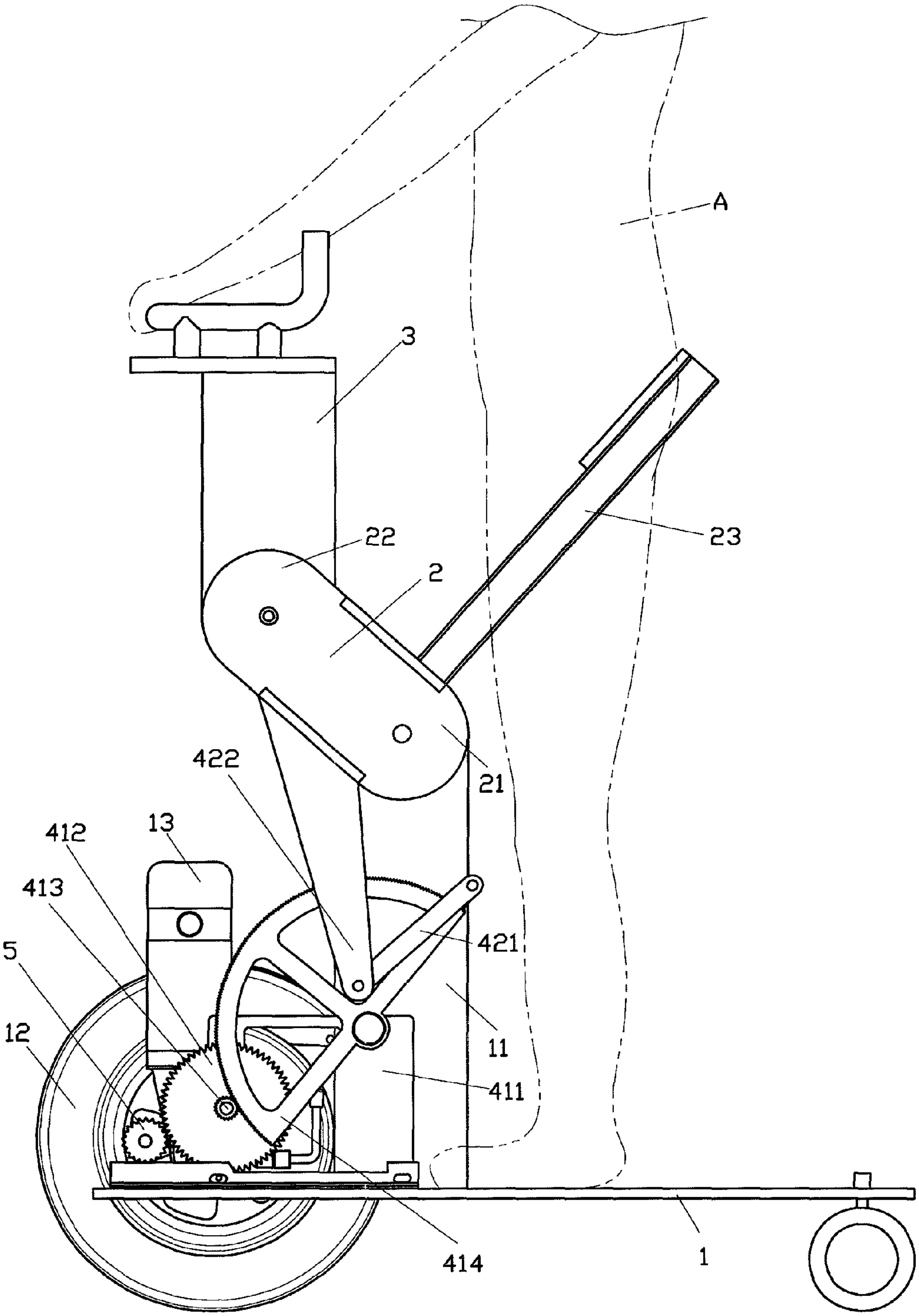
FIG. 4 shows that the seat is lifted to assist the user to stand up.

Referring to FIGS. 3 and 4, when the user "A" sits on the seat 23, the power unit 5 is operated in a reverse direction to rotate the gear unit 41 and the link unit 42 in the reverse direction, and the seat 23 is lifted to a best height for the user "A". When the user "A" wants to stand up, the power unit 5 is operated to lift the seat 23 until the feet of the user "A" become straight so that the user "A" is easily to stand up.

It is noted that the number of the teeth of the first gear 412, the second gear 413 and the fan-shaped gear 414 are arranged to be a large gear, a small gear and a large gear in sequence. The aim of force of the first link 421 is less than that of the second link 422, so that only small horse power is input, a large torque can be generated. When moving the seat 23, the seat 23 can support large load and the two links of the link unit 42 do not interfere with each other during operation.

While we have shown and described the embodiment in accordance with the present invention, it should be clear to those skilled in the art that further embodiments may be made without departing from the scope of the present invention.

What is claimed is:

1. An assistance mechanism, comprising:

a base having a post extending from a top thereof and multiple wheels connected to the base;

a rotatable link having a first end pivotably connected to the post and a seat fixedly connected to the rotatable link;

a handle unit directly pivotably connected to a second end of the rotatable link;

a lifting unit connected to the rotatable link and the base, the lifting unit driving the rotatable link, and a power unit connected to the lifting unit and providing power to the lifting unit, wherein the lifting unit comprises a gear unit and a link unit, the gear unit is connected with the power unit, and the link unit is connected to the gear unit and the rotatable link, and wherein the gear unit comprises a frame, a first gear, a second gear and a fan-shaped gear, the frame is fixed to the base and the first gear is connected to the power unit, the first gear is pivotably connected to the frame, the second gear is co-rotatable with the first gear, the fan-shaped gear is engaged with the second gear, the fan-shaped gear is pivotably connected to the frame, a number of teeth of the second gear is less than that of the first gear, a number of teeth of the fan-shaped gear is larger than that of the second gear.

2. The mechanism as claimed in claim 1, wherein the link unit comprises a first link and a second link, the first link is pivotably connected to the fan-shaped gear and the second link is pivotably connected between the first link and the rotatable link, a length of the second link is longer than that of the first link.

3. The mechanism as claimed in claim 1, the seat being pivotable to a first position, a second position, and third position, in the first position, the seat being inclined downwardly, in the second position, the seat being horizontal, and in the third position, the seat being inclined upwardly.

4. The mechanism as claimed in claim 1, the post having a front side and a back side, with the front and back sides being opposed, the lifting unit being on the front side and the chair being on the back side of the post throughout operation of the device.

5. The mechanism as claimed in claim 1, the seat being positionable to be between the legs of the user, when in use.

* * * * *